Oct. 25, 1949.  E. H. POLK  2,485,655
EXHAUST TURBINE DRIVEN FAN AND SUPERCHARGER
Filed July 21, 1944
Fig. 1.
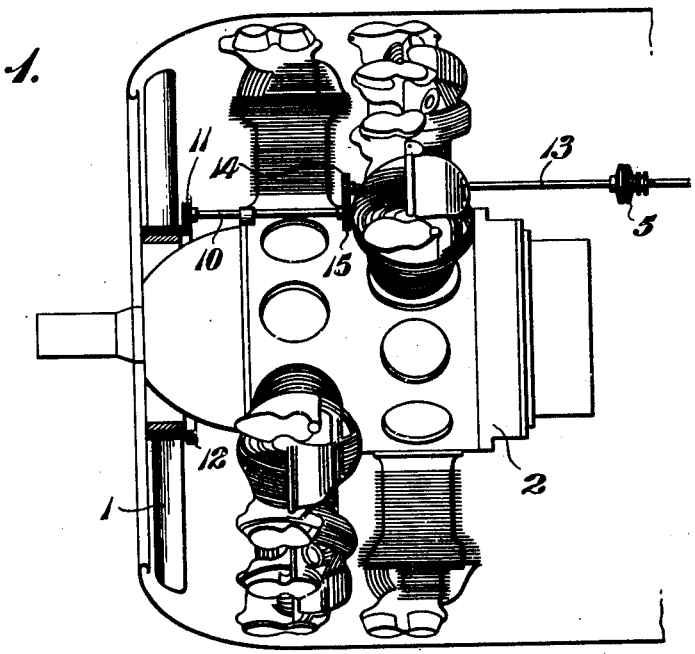
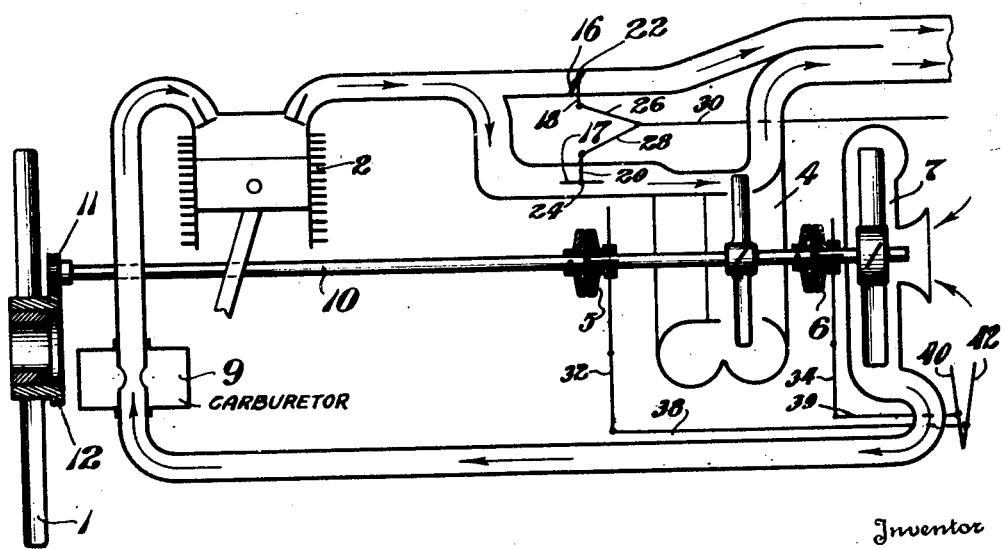
Fig. 2.
Inventor
Edwin H. Polk,
By W. Glenn Jones
Attorney Patented Oct. 25, 1949

2,485,655

UNITED STATES PATENT OFFICE 2,485,655

EXHAUST TURBINE DRIVEN FAN AND SUPERCHARGER

Edwin H. Polk, United States Navy

Application July 21, 1944, Serial No. 546,032

4 Claims. (Cl. 60—13)

(Granted under the act of March 3, 1883, as amended April 30, 1928; 370 O. G. 757)

This invention deals with air-cooled internal combustion engines for aircraft.

One of the problems in this type of engine is to obtain the necessary cooling at maximum output when starting off. Aircraft engines usually have a compressor or supercharger for supplying the necessary air at high altitudes. Some of these compressors are driven by an exhaust turbine.

It is one of the objects of this invention to combine in an air-cooled aircraft engine an exhaust turbine with means for driving the supercharger and a cooling fan selectively or together.

Another object is to provide an air-cooled internal combustion engine with a cooling fan driven by an exhaust turbine through a clutch.

Another object is to provide an air-cooled aircraft engine with an exhaust turbine for driving a cooling fan and a supercharger, through clutch means, so that either one or both may be driven thereby.

Further and more specific objects will be apparent in the detailed description of a preferred form of the present invention, accompanied by the drawing, wherein:

Figure 1 is a perspective view of a double row radial air-cooled engine equipped with a fan and driving means therefor in accordance with the present invention;

Figure 2 is a schematic diagram of one form of the present invention.

In the preferred form of this combination, a cooling fan 1 is mounted on the forward end of the radial air-cooled engine 2 between the propeller (not shown) and engine cylinders. As shown in the drawing, it is driven by shaft 10 through gears 11 and 12. Shaft 10 is driven by shaft 13 through gears 14 and 15, and shaft 13 is driven by the turbine 4 through the clutch 5. The turbine is also connected by a clutch 6 to the supercharger 7 for driving it at high altitudes or when increased compression is desired.

Exhaust gases from the engine may be delivered in any proportions desired to the turbine blades by means of the control valves 16 and 17. An interconnecting linkage comprising cranks 18 and 20 which are connected to rotatable shafts 22 and 24 of valves 16 and 17 respectively, connecting links 26 and 28 pivotally connected to the inner ends of cranks 18 and 20 and to the end of control rod 30, may be used between these valves if desired to cause one valve to close as the other is opened.

Since a turbine driven supercharger cannot be used to full advantage at take-off, at altitudes below critical, or while taxiing on the ground, the rotor of the supercharger is used to power the cooling fan. On take-offs and when taxiing, the engine is in danger of over-heating due to the limited quantity of cooling air passing inside the cowling. The exhaust-driven rotor is therefore used at such times to drive the cooling fan to increase the quantity of cooling air.

A similar cooling fan is used on the German Focke-Wulf 190A-3 fighter plane, but is driven mechanically by gears and shafting off the propeller reduction gear. It is estimated that about 100 horsepower is absorbed from the engine by the fan at maximum speed at take-offs, just when the total power is needed most. This fan is 32 inches in diameter and turns at 3.143 to 1 of propeller speed. It is constructed of magnesium alloy.

By using the turbo of the supercharger to power the cooling fan, the energy in the present combination is derived from the exhaust gases. After take-offs or when critical altitude has been reached, the fan is disengaged through a clutch from the turbine. The turbine is then engaged through another clutch to the air impeller in the supercharger to supply air to the carburetor 9. The power absorbed by the free wheeling cooling fan is negligible while disconnected from the turbine.

The power from the turbo could be directed to the forward end of the engine by any other known transmission method, besides the gear means shown.

Suitable controls such as levers 32 and 34 connected to clutches 5 and 6, respectively, and operably connected by control rods 38 and 39 to handles 42 and 40, as shown, e. g., in Fig. 2, may be used for either manually or automatically selectively engaging and disengaging the clutches 5 and 6 so that the fan may be driven by the turbo at the time of taking off on a flight, when the throttle is wide open and the maximum cooling is desirable, and so that the fan may be disconnected when the air speed is sufficient to provide the necessary cooling, and further, so that the supercharger may be connected to the turbo drive to provide the necessary air at high altitudes or whenever desired.

Various modifications in the arrangement and proportions of the parts of the combination may be made without departing from the spirit and scope of the present invention, as defined in the appended claims.

The invention described herein may be manufactured and used by or for the Government of the United States of America for governmental purposes without the payment of any royalties thereon or therefor.

What is claimed is:

1. A air-cooled internal combustion engine provided with a cooling fan, means for driving said cooling fan, an exhaust turbine connected to said driving means by a clutch, and a supercharger driven by said turbine through another clutch.

2. In an aircraft powered by an air-cooled engine, a cowling around said engine having an opening in the front thereof, a cooling fan mounted adjacent to this opening in front of the engine cylinders, a drive shaft having a gear for driving said fan, an exhaust turbine fed by the exhaust from the engine, and driving connections between said turbine and said shaft including a clutch means.

3. In an aircraft powered by an air-cooled internal combustion engine, a cooling fan mounted in front thereof, an exhaust turbine having means for driving said cooling fan through a manually controlled clutch, and a supercharger with driving means connected to said turbine, also through a manually controlled clutch.

4. The combination with an air-cooled internal combustion engine having an exhaust turbine and a supercharger driven thereby through a clutch means, a cooling fan mounted in front of the engine, and driving means therefor including a clutch between said fan and the turbine.

EDWIN H. POLK.

REFERENCES CITED

The following references are of record in the file of this patent:

UNITED STATES PATENTS

| Number | Name | Date |
|---|---|---|
| 1,410,726 | Schoonmaker | Mar. 28, 1922 |
| 1,525,212 | Thomas | Feb. 3, 1925 |
| 1,731,708 | Crew | Oct. 15, 1929 |
| 1,732,578 | Garuffa | Oct. 22, 1929 |
| 1,900,586 | Rippe | Mar. 7, 1933 |
| 2,274,743 | Rosskopf | Mar. 3, 1942 |
| 2,384,381 | Jocelyn | Sept. 4, 1945 |

FOREIGN PATENTS

| Number | Country | Date |
|---|---|---|
| 321,933 | Great Britain | Nov. 19, 1929 |
| 398,902 | Germany | July 16, 1924 |